US006531177B1

(12) United States Patent
Malbon

(10) Patent No.: US 6,531,177 B1
(45) Date of Patent: Mar. 11, 2003

(54) COMPOSITION FOR USE IN ADDING AN ADDITIVE TO A LIQUID

(76) Inventor: Raymond Mark Malbon, New House Farm, Stanton, Nr., Ashbourne, Derbyshire (GB), DE6 2DD ( * ) Notice: Subject to any disclaimer, the term of this patent is extended or adjusted under 35 U.S.C. 154(b) by 32 days.

(21) Appl. No.: 09/679,463

(22) Filed: Oct. 4, 2000

(30) Foreign Application Priority Data

Oct. 6, 1999 (GB) .............................................. 9923492

(51) Int. Cl.[7] ........................ A23L 1/035; A23L 1/052; A23L 1/053; A23L 1/0522; A23L 1/0524; A23L 1/0526; A23L 1/0528; A23L 1/0532; A23L 1/0534
(52) U.S. Cl. ........................................ 426/654; 426/601
(58) Field of Search ................................. 426/654, 601

(56) References Cited

U.S. PATENT DOCUMENTS 4,722,483 A      2/1988  Saville et al.
4,772,483 A      9/1988  Nolte

FOREIGN PATENT DOCUMENTS

| EP | 0229938 A1 | 7/1987 |
| GB | 1193332 | 5/1970 |
| GB | 2131669 A | 6/1984 |
| WO | WO 91/1 | 8/1991 |
| WO | WO 91/11109 A1 | 8/1991 |
| WO | WO 95/05751 | 3/1995 |
| WO | WO 95/05751 A1 | 3/1995 |

*Primary Examiner*—Anthony J. Weier
(74) *Attorney, Agent, or Firm*—Adams, Schwartz & Evans, P.A.

(57) ABSTRACT

A composition is described for adding an additive, for example an emulsifier and/or stabiliser, to a liquid. The composition includes a first ingredient in the form of the additive, which may be a food grade emulsifier and/or stabiliser. The composition also includes a second ingredient which may be a fat material. The first ingredient is dispersed within the second ingredient. A method of producing is also described in which the composition is produced by mixing the first and second ingredients such that the first ingredient is dispersed within the second ingredient.

9 Claims, No Drawings

COMPOSITION FOR USE IN ADDING AN ADDITIVE TO A LIQUID

This application claims the priority date of Oct. 6, 1999 for United Kingdom Patent Application No. 9923492.4.

BACKGROUND OF THE INVENTION

This invention relates to compositions for use in adding additives to liquids. More particularly but not exclusively, this invention relates to compositions for use in emulsifying and/or stabilising food products.

Many food products require use of emulsifiers and stabilisers in order to attain their optimum performance. Incomplete dispersion of the combination of ingredients is extremely common, an effect which may or may not be apparent during the mixing process.

Emulsifier and/or stabilisers can be dispersed by premixing with other dry solids (e.g. sugar) and sprinkling into the liquid mixture at, for example, 50–55 Celsius with continuous stirring. This can be done either with or without premixing, but premixing is desirable because fewer problems are then experienced. In another method emulsifiers and stabilisers may be combined either by spray-chilling or agglomeration into small granules or coarse powder; these products are more consistent and disperse rather more easily (for example at lower temperatures and with easier mixing). The food is then homogenised using a pressure homogeniser; alternatively, homogenisation may be accomplished using high-speed homogeniser mixers.

Manufacturers experience many difficulties, which vary with the machinery, methods and levels of competence in production. Stabilisers (generally hydrocolloids or other long chain molecules with viscosity-enhancing and/or water-binding characteristics) can hydrate quickly with increase of viscosity so that further dispersion of grains is hindered; the ingredients may obviously disperse incompletely, with lumps of material which will not disperse. Other disadvantages are that a slime of non-dispersed emulsifier/stabiliser may be retained in the mixing vessel, so that the food has received the incorrect active dosage. In such cases, in-line filters, where used, may become blocked with incorrectly dispersed ingredient (again indicating a reduced effective dosage) and the machinery will need to be stripped more often. The difficulty can be much worse in some areas where old machinery is inadequate for correct mixing.

When the above occurs (which may not always be obvious at the mixing stage), the final product will be inconsistent, or be incorrectly stabilised or emulsified. Manufacturers will find unexplained products variation in mixes with the same formulation and processing, with consequent inefficiencies. The mouthfeel of the final product is affected, as is the structure and technical performance.

Modern processing systems attain better productivity in the case of many frozen products, if the mixture requires a minimum period of ageing (cool storage with gentle agitation to enable stabilisers, milk proteins etc. to achieve their full performance). Frequently measures to speed production will produce an obvious deterioration in product quality.

SUMMARY OF THE INVENTION

According to one aspect of this invention, there is provided a composition for use in adding an additive to a liquid, said composition comprising a first ingredient comprising the additive, and a second ingredient comprising a fat material, wherein the first ingredient is dispersed within the second ingredient.

Preferably, the additive comprises an emulsifier and/or a stabiliser.

According to another aspect of this invention, there is provided a composition for use in emulsifying and/or stabilising a food, said composition comprising a first ingredient comprising an additive in the form of a food grade emulsifier and/or a food grade stabiliser, and a second ingredient comprising a food grade fat material, wherein the first ingredient is dispersed within the second ingredient.

According to another aspect of this invention there is provided a method of producing a composition for use in adding an additive to a liquid, said method comprising providing a first ingredient comprising the additive, providing a second ingredient comprising a fat material in liquid form, and mixing the first and second ingredients such that the first ingredient is dispersed within the second ingredient.

Preferably the additive comprises an emulsifier and/or a stabiliser.

According to another aspect of the invention, there is provided a method of producing a composition for use in emulsifying and/or stabilising a food product, the method comprising providing a first ingredient comprising a food grade emulsifier and/or a food grade stabiliser, providing a second ingredient comprising a food grade fat material, and mixing the first and second ingredients such that the first ingredient is dispersed within the second ingredient.

The second ingredient may be melted and the first ingredient may thereafter be added thereto. Alternatively, the, or at least some of the, first ingredient may be melted and the second ingredient added thereto.

Preferably, one embodiment of the method involves mixing the emulsifier and the stabiliser and thereafter adding said mixture to the fat material, which may be molten. Alternatively, the emulsifier, the stabiliser and the fat material may be added together as a substantially single step. In a further embodiment, the emulsifier may be melted and the other ingredients added thereto.

The mixture of the first ingredient and the fat material may be heated and mixed in appropriate mixing apparatus. The first and second ingredients may undergo a grinding step before or after substantially complete melting of the first and second ingredients has occurred.

In another embodiment, the fat material may be heated, preferably to melt the fat material substantially completely and thereafter the first ingredient may be added. Alternatively, the first ingredient may be added to the fat material during heating.

Preferably, the first ingredient is substantially uniformly dispersed within the second ingredient. The dispersal of the first ingredient in the second may comprise dissolving the first ingredient in the second. The dispersal of the first ingredient in the second ingredient may comprise dissolving and/or suspending at least part of the first ingredient in the second ingredient.

Preferably, the fat material is substantially solid at room temperature, and said composition is preferably substantially solid at room temperature.

Preferably, the ingredients are mixed at an elevated temperature whereby the fat material is in a molten form.

After the ingredients are mixed, the composition is desirably allowed to solidify. Conveniently, the product is cooled to allow it to solidify. The mixed composition may be extruded during cooling to allow the composition to solidify in a desired configuration.

The temperature at which said mixing takes place may be in the range of from substantially 25° C. to substantially 75° C., preferably substantially 50° C. to substantially 70° C., for example substantially 52° C. to substantially 68° C. More preferably, the temperature of mixing is in the range of from substantially 55° C. to substantially 70° C., for example substantially 57° C. to substantially 67° C.

The first and second ingredients may be mixed by stirring. The mixing step may be carried out for a period of time of up to substantially 24 hours, desirably, up to, or for, substantially 15 hours, preferably up to, or for, substantially 4 hours, more preferably up to, or for, substantially 2 hours. In one embodiment, the mixing step was carried out for a period of time in the range of from substantially 2 hours to substantially 4 hours. Preferably, measurement of the time for mixing the ingredients commences after the ingredients have been added together. Before or during mixing the ingredients may be subjected to particle size reduction by particle size reduction means, preferably, to a particle size of less than substantially 20 μm. Preferably, the ingredients are ground by grinding means.

The additive may be provided in an amount of from substantially 40 wt % to substantially 80 wt %, preferably from substantially 60 wt % to substantially 70 wt %, more preferably substantially 64 wt % to substantially 68 wt %.

The proportion of emulsifier to stabiliser may be in the range 100:0 (emulsifier to stabiliser) to 0:100, preferably in the range 90:10 to 0:100, more preferably in the range 80:20 to 60:40. In one embodiment, the proportion of emulsifier to stabiliser is 68:32.

The fat material may be provided in an amount of from substantially 20wt % to substantially 50 wt %, preferably from substantially 30 wt % to substantially 40 wt %, more preferably substantially 32 wt % to substantially 36 wt %

The fat material may comprise vegetable fat which may comprise hydrogenated vegetable fat. Alternatively, or in addition, the fat may comprise butterfat or other animal fat.

The emulsifier may comprise, for example one or more of E471, lecithin, sorbitan esters, sucrose esters.

The stabiliser may comprise, for example, one or more of guar gum, carob gum, carrageenan, sodium alginate, pectin, xanthan gum, carboxymethyl cellulose, modified starches.

Further ingredients may be provided to improve the quality of the product. One said further ingredient may comprise an agent for assisting the setting or solidifying of the composition. Said agent may comprise a high-melting point fractionated fat. The agent may contain hydrogenated vegetable oils.

The agent may be provided in an amount less than substantially 5%, conveniently, less than substantially 1½ wt %, preferably in the range of from substantially 1 wt % to substantially 1 ½ wt %. In one embodiment, the agent may be added in an amount of substantially 1 wt %, for example 1.1 wt %.

In addition, or alternatively, one of said further ingredients may comprise a flavour enhancer. The amount of flavour enhancer may be selected to provide an amount in the food product of substantially 60 ppm. The flavour enhancer may be provided in the composition in an amount of 6600 ppm. The flavour enhance may be, for example, vanilla, buttery vanilla, strawberry, chocolate.

In addition to said agent and/or said flavour enhancer, a colour may be provided.

According to another aspect of this invention there is provided a method of adding an additive to a liquid comprising adding to the liquid a composition as described above and mixing the composition and the liquid so that the composition is generally uniformly distributed within the liquid and thereafter allowing the liquid to solidify.

DETAILED DESCRIPTION OF THE INVENTION

Embodiments of the invention will now be described by way of example only.

Example I

Emulsifier (E471) to stabiliser (E412 (guar gum), E407 (carrageenan), E410 (carob gum) in a ratio of 68:32.

| Ingredient | Parts by Weight |
| --- | --- |
| Combination of emulsifier and stabiliser | 60 |
| Ice cream fat (hydrogenated vegetable oils) | 24 |
| Non-hydrogenated vegetable oils | 5 |
| High melting point fractionated fat | 1 |
| Flavour enhancer (concentrated) | 0.5–0.7 |

The ingredients were melted and ground together. The molten mixture was then formed into blocks and allowed to set by cooling. It will be appreciated that the mixture could be formed into other suitable shapes or extruded.

More specifically, the ingredients were ground to a particle size of less than 2 μm and then mixed together by stirring the ingredients in an appropriate sized vessel.

During the mixing of the ingredients, the mixture was heated to a temperature in the range of 57° C. to 67° C. The mixing step was carried out for a period of time of between 2 and 4 hours, and when the mixing step was finished, the molten mixture was formed into blocks and allowed to set by cooling. The blocks could then be cut into appropriate sized smaller blocks for packaging and distribution or storage.

The composition can be used for adding the emulsifier and stabiliser dispersed therein to a food product in liquid form, which may be at an elevated temperature. The composition is added to the liquid food product and the food product/composition is then mixed until the composition is uniformly distributed within the food product. The fat material in the composition is either dissolved or melted in the liquid, whereas the emulsifier and the stabiliser are uniformly distributed within the food product.

Example II

The following ingredients were ground to a particle size of less than 20 mm and mixed by stirring to form a mixture of fats.

| Ingredient | Quantity |
| --- | --- |
| Fat Regency (ice cream fat blend) | 336 kg |
| Fat blend (low melting) | 70 kg |
| Cessa Special 46 Powder | 14 kg |

The mixture of fats was then heated to substantially 60° C. and the following ingredients were ground to a particle size of less than 20 mm and added to the mixture of fats to form an emulsifier/stabiliser mixture.

| Ingredient | Quantity |
| --- | --- |
| Emulsifier 600V | 583.9 kg |
| Carrageenan IC2261 | 29.4 kg |
| Guar gum 'SG' | 101.5 kg |
| Carob gum (locust bean gum) | 23.8 kg |
| Guar gum low viscosity P2 | 119.7 kg |

The emulsifier/stabiliser mixture was melted at a temperature in the range of 64–66° C. and mixed by stirring for 3 to 4 hours. After this period the following ingredients were added:

| Ingredients | Quantity |
| --- | --- |
| Tocopherol | 128.03 g |
| Lecithin Topcithin 50 | 640.15 g |
| Citric Acid Anhydrous | 128.03 g |
| Ascorbyl Palmitate | 38.15 g |

After these ingredients were added the overall mixture was stirred thoroughly and thereafter was formed into blocks and allowed to solidify.

There is thus described a composition, the preferred embodiment of which can be used to add an emulsifier and/or a stabiliser to a food product such that the emulsifier and/or stabiliser is substantially uniformly distributed throughout the food products.

Various modifications can be made without departing from the scope of the invention.

Whilst endeavouring in the foregoing specification to draw attention to those features of the invention believed to be of particular importance it should be understood that the applicant claims protection in respect of any patentable feature or combination of features hereinbefore referred to whether or not particular emphasis has been placed thereon.

What is claimed is:

1. An emulsifying/stabilizing composition comprising a first ingredient comprising an additive consisting of a food grade emulsifier and a food grade stabilizer, the additive being present in an amount in the range of 40 wt % to 80 wt % of the composition, wherein the ratio of emulsifier to stabilizer is in the range of 80:20 to 60:40 and a second ingredient comprising a food grade fat material in an amount in the range of 20 wt % to 50 wt % of the composition, wherein the first ingredient is dispersed with the second ingredient.

2. A composition according to claim 1, wherein the additive is present in an amount of in the range of from 50 wt % to 70 wt % of the composition.

3. A composition according to claim 1, wherein the additive is present in an amount of from 64 wt % to 68 wt % of the composition.

4. A composition according to claim 1, wherein the proportion of emulsifier to stabilizer is 68:32.

5. A composition according to claim 1, wherein the fat material is present in an amount of from 50 wt % to 40% of the composition.

6. A composition according to claim 1, wherein the fat material is present in an amount of from 32 wt % to 36 wt % of the composition.

7. A composition according to claim 1, wherein an agent is provided for assisting the setting or solidifying of the composition.

8. A composition according to claim 7, wherein said agent comprises a high-melting point fractionated fat.

9. A composition according to claim 1, wherein the agent may be provided in an amount less than substantially 5% of the composition.

* * * * *